United States Patent [19]

Heilig et al.

[11] Patent Number: 5,084,485

[45] Date of Patent: Jan. 28, 1992

[54] PROCESS FOR THE PRODUCTION OF RIGID FOAMS CONTAINING URETHANE AND PREDOMINANTLY ISOCYANURATE GROUPS AND THEIR USE AS INSULATING MATERIALS

[75] Inventors: Gerhard Heilig, Bergisch Gladbach; Rolf Wiedermann, Odenthal-Voiswinkel; Wolfgang Schmitz, Odenthal-Blecher, all of Fed. Rep. of Germany

[73] Assignee: Bayer Aktiengesellschaft, Leverkusen, Fed. Rep. of Germany

[21] Appl. No.: 718,743

[22] Filed: Jun. 21, 1991

[30] Foreign Application Priority Data

Jun. 26, 1990 [DE] Fed. Rep. of Germany ....... 4020255

[51] Int. Cl.$^5$ .............................................. C08J 9/08
[52] U.S. Cl. ..................................... 521/125; 521/902
[58] Field of Search ............................... 521/125, 902

[56] References Cited

U.S. PATENT DOCUMENTS

| | | |
|---|---|---|
| 3,993,608 | 11/1976 | Wells .................................. 521/902 |
| 4,094,869 | 6/1978 | Biranowski et al. ................ 521/171 |
| 4,271,273 | 6/1981 | Brianowski et al. ................ 521/902 |
| 4,393,015 | 7/1983 | Kaneda et al. ...................... 521/902 |
| 4,456,709 | 6/1984 | Richter et al. ...................... 521/902 |
| 4,579,877 | 4/1986 | Goel et al. ........................... 521/902 |
| 4,607,064 | 8/1986 | Kuhn et al. .......................... 521/902 |
| 4,661,529 | 4/1987 | Kuhn et al. .......................... 521/902 |
| 4,829,097 | 5/1989 | Tormala et al. ..................... 521/123 |

*Primary Examiner*—Morton Foelak
*Attorney, Agent, or Firm*—Joseph C. Gil; Lyndanne M. Whalen

[57] ABSTRACT

Rigid foams containing urethane and isocyanurate groups are made by reacting a polyisocyanate with a compound containing at least two isocyanate reactive hydrogen atoms in the presence of an aqueous solution of alkali metal carboxylate in accordance with known techniques. The aqueous alkali metal carboxylate solution has an alkali metal carboxylate content of from about 10 to about 50% by weight. The alkali metal carboxylates are preferably alkali metal acetates such as potassium acetate. This process is carried out at an index above 150. The product foams are particularly useful as insulating materials.

8 Claims, No Drawings

PROCESS FOR THE PRODUCTION OF RIGID FOAMS CONTAINING URETHANE AND PREDOMINANTLY ISOCYANURATE GROUPS AND THEIR USE AS INSULATING MATERIALS

BACKGROUND OF THE INVENTION

The present invention relates to a process for the production of rigid closed-cell foams containing urethane, urea and biuret groups which are useful as insulating materials.

Rigid foams containing urethane and predominantly isocyanurate groups (hereinafter referred to in short as PIR o foams) have been known for some time. Trichlorofluoromethane or other halogenated hydrocarbons are normally used as blowing agents in their production.

Alkali carboxylates generally dissolved in polyols having a high OH value are typically used as catalysts in the production of these foams. Where relatively large quantities of these catalysts are used in the production of foams, the index is shifted to such an extent that the property level of the foams is adversely affected. In particular, the dimensional stability of the products is seriously impaired.

SUMMARY OF THE INVENTION

It is an object of the present invention to provide a process for the production of highly crosslinked, dimensionally stable and tough PIR foams in which water is used as solvent for the catalyst salts.

It is another object of the present invention to provide a process for the production of highly crosslinked, dimensionally stable PIR foams in which halogenated hydrocarbons, such as trichlorofluoromethane, can be saved or can be made totally superfluous as blowing agents.

It is also an object of the present invention to provide a process for the production of PIR foams which when processed as sheet material by the laminator process have only very slight differences between free density and overall density.

These and other objects which will be apparent to those skilled in the art are accomplished by reacting a polyisocyanate with a compound having at least two isocyanate-reactive hydrogen atoms and a molecular weight of from 400 to about 10,000 at an index greater than 150 in the presence of an aqueous alkali metal carboxylate solution in which the alkali metal carboxylate content is from about 10 to about 50% by weight. The water in the aqueous alkali metal carboxylate solution functions as a solvent for the alkali metal carboxylate catalyst and reacts with the isocyanate groups to produce carbon dioxide which functions as a blowing agent.

DETAILED DESCRIPTION OF THE INVENTION

The present invention relates to a process for the production of rigid foams containing urethane and predominantly isocyanurate groups in which a) at least one polyisocyanate is reacted with b) at least one compound having at least two isocyanate-reactive hydrogen atoms and a molecular weight of from 400 to about 10,000 and, optionally, c) a chain-extending and/or crosslinking agent having at least two isocyanate-reactive hydrogen atoms and a molecular weight of from about 32 to 399 in the presence of d) water as blowing agent and e) a trimerization catalyst and optionally in the presence of f) other blowing agents and other known auxiliaries and additives. This reaction is carried out at an index above 150 and preferably in the range from about 170 to about 300. An aqueous solution of an alkali metal carboxylate, preferably an acetate and, most preferably, potassium acetate having an alkali metal carboxylate content of from about 10 to about 50% by weight is used as blowing agent d) and trimerization catalyst e).

In a preferred embodiment of the invention, the alkali metal carboxylate content of the aqueous solution is from about 20 to about 40% by weight, the foams are produced using at least 1.0% by weight water and preferably at least 1.4% by weight water, based on the polyisocyanate, and, in particular, the foams are produced using halogen-free flameproofing agents.

The isocyanates useful for the production of rigid foams containing urethane and predominantly isocyanurate groups by the process of the present invention include: aliphatic, cycloaliphatic, araliphatic, aromatic and heterocyclic polyisocyanates of the type described, for example, by W. Siefken in Justus Liebigs Annalen der Chemie, 562, pages 75 to 136, for example those corresponding to the formula

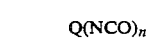

$Q(NCO)_n$ in which
n = 2 to 4, preferably 2, and
Q is an aliphatic hydrocarbon radical containing 2 to 18 and preferably 6 to 10 carbon atoms, a cycloaliphatic hydrocarbon radical containing 4 to 15 and preferably 5 to 10 carbon atoms, an aromatic hydrocarbon radical containing 6 to 15 and preferably 6 to 13 carbon atoms or an araliphatic hydrocarbon radical containing 8 to 15 and preferably 8 to 13 carbon atoms. Specific examples of such polyisocyanates are given in German Offenlegungsschrift 2,832,253, pages 10 to 11. It is particularly preferred to use the commercially readily obtainable polyisocyanates, such as 2,4- and 2,6-tolylene diisocyanate, and mixtures of these isomers ("TDI") and polyphenyl polymethylene polyisocyanates of the type produced by phosgenation of aniline-formaldehyde condensates ("crude MDI") and polyisocyanates containing carbodiimide groups, urethane groups, allophanate groups, isocyanurate groups, urea groups or biuret groups ("modified polyisocyanates"), more particularly the modified polyisocyanates derived from 2,4-and/or 2,6-tolylene diisocyanate or from 4,4'- and/or 2,4-diphenyl methane diisocyanate.

The compounds having at least two isocyanate-reactive hydrogen atoms and a molecular weight of from 400 to about 10,000 useful in the process of the present invention include: compounds containing amino groups, thiol groups, carboxyl groups, and preferably compounds containing hydroxyl groups. Compounds having 2 to 8 hydroxyl groups, especially those having a molecular weight in the range from about 1,000 to about 6,000 and preferably in the range of from about 2,000 to about 6,000. Polyethers, polyesters, polycarbonates and polyester amides containing at least 2, generally 2 to 8, preferably 2 to 6 hydroxyl groups, and preferably having an OH value of from about 28 to about 56 which are known to be useful for the production of homogeneous and cellular polyurethanes are examples of the types of isocyanate reactive compounds which may be advantageously employed in the process of the present invention. Specific examples of these known compounds are given in German Offenlegungsschrift 2,832,253, pages 11-18. Mixtures of different compounds of this type can be used.

Optionally, compounds containing at least two isocyanate-reactive hydrogen atoms and having a molecular weight of from 32 to 399 may be included in the reaction mixture during the process of the present invention. These optional compounds may contain hydroxyl groups and/or amino groups and/or thiol groups and/or carboxyl groups, but are preferably compounds containing hydroxyl groups and/or amino groups, which serve as chain extending agents and/or crosslinking agents. These compounds generally contain from 2 to 8 and preferably from 2 to 4 isocyanate-reactive hydrogen atoms. Specific examples of these compounds are given in German Offenlegungsschrift 2,832,253, pages 10-20.

The aqueous solution of alkali metal carboxylate is preferably an aqueous solution of an alkali metal acetate, more preferably potassium acetate. This aqueous solution has an alkali metal carboxylate content of from about 10% to about 50% by weight. The water acts as blowing agent while the alkali metal carboxylates act as trimerization catalyst. Suitable carboxylates are generally those containing 1 to 6 carbon atoms and preferably those containing 2 to 4 carbon atoms.

Optional auxiliaries and additives which may be employed in the process of the present invention include: readily volatile organic substances which act as further blowing agents; known reaction accelerators and reaction retarders; surface-active additives, such as emulsifiers and foam stabilizers; known cell regulators such as paraffins or fatty alcohols or dimethyl polysiloxanes; pigments; dyes; known flame retarding agents such as diphenyl cresyl phosphate, tricresyl phosphate; stabilizers against the effects of aging and weathering; plasticizers; fungistatic and bacteriostatic agents; and also fillers, such as barium sulfate, kieselguhr, carbon black or whiting.

Specific examples of these optional auxiliaries and additives are described, for example, in German Offenlegungsschrift 2,732,292, pages 21-24. Other examples of surface-active additives and foam stabilizers, cell regulators, reaction retarders, stabilizers, flameproofing agents, plasticizers, dyes, fillers, fungistatic and bacteriostatic agents which may optionally be used in accordance with the invention and details on the use of such additives and the way in which they work can be found in Kunststoff-Handbuch, Vol. VII, edited by Vieweg and Hochtlen, Carl Hanser Verlag, Munchen, 1966, for example on pages 103 to 113.

In the process of the present invention, the reaction components may be reacted by the known single-stage process, the prepolymer process or the semiprepolymer process. Machines such as those described in U.S. Pat. No. 2,764,565 may be used. Particulars of other processing machines which may also be used in the practice of the present invention are given in Kunststoff-Handbuch, Vol. VII, edited by Vieweg and Hochtlen, Carl Hanser Verlag, Munchen 1966, for example on pages 121-205.

In the process of the present invention, all of the components are reacted at an index above 150 and preferably at an index of from about 170 to about 300.

The index, a term used very frequently in the production of polyurethane foams, says something of the degree of crosslinking of a foam. It is customary to regard a foam in which isocyanate has been used in the stoichiometric quantity or in the theoretically necessary quantity as having been produced with an index of 100. Accordingly, it is possible with the aid of the index more closely to define the degree of undercrosslinking or overcrosslinking. The index is calculated in accordance with the following general formula:

$$\text{Index} = \frac{\text{quantity of isocyanate (practical)}}{\text{quantity of isocyanate (theoretical)}} \times 100$$

In the process of the present invention, the single-stage process is preferred. The rigid foams containing urethane and predominantly isocyanate groups may also be produced with advantage by the known laminator process.

The rigid foams containing urethane and predominantly isocyanurate groups produced in accordance with the present invention may be used, for example, as insulating materials, particularly in the building industry.

Having thus described our invention, the following Examples are given as being illustrative thereof. All parts and percentages given in these Examples are parts by weight and percentages by weight, unless otherwise indicated.

EXAMPLES

Example 1 (comparison)

A polyol mixture having an OH value of 205 and a viscosity at 25° of 630 mPa.s was prepared from the following:
1. 20 parts by weight of a polyether, OH value 875,(molecular weight 192 prepared by propoxylation of trimethylol propane
2. 30 parts by weight of a polyether, OH value 56,(molecular weight 2000 prepared by propoxylation of propylene glycol
3. 30 parts by weight of a polyether, OH value 45,(molecular weight 3750 prepared by propoxylation of trimethylol propane, reaction of the reaction product with a block polyol of ethylene oxide/propylene oxide (EO:PO =1:3.8) and subsequent propoxylation
4. 20 parts by weight diphenyl cresyl phosphate as flameproofing agent and
5. 2 parts by weight of a commercially available polyether polysiloxane foam stabilizer (OS 50, a product of Bayer AG, Leverkusen).

This mixture is hereinafter referred to as the polyol component.

A rigid foam containing urethane and predominantly isocyanurate groups was produced using a solution of potassium acetate in diethylene glycol as catalyst from the following:

| | |
|---|---|
| Polyol component | 102 parts by weight |
| Dimethyl cyclohexyl amine | 0.5 part by weight |
| 25% solution of potassium acetate in diethylene glycol | 5.6 parts by weight |
| Water | 4.0 parts by weight |
| Polyisocyanate (crude MDI, Desmodur-44V20, a product of Bayer AG, Leverkusen) | 232 parts by weight |
| Isocyanate index | 197 |

The foam showed shrinkage even in the laboratory mold and was not suitable for technical purposes.

EXAMPLE 2 (invention)

A foam was produced using the same reactants as were used in Example 1 with the exception that an aqueous potassium acetate solution was employed rather than the potassium acetate in glycol and water. The specific materials and amounts used to produce this foam were as follows:

| | |
|---|---|
| Polyol component | 102 parts by weight |
| Dimethyl cyclohexyl amine | 0.5 part by weight |
| 26% aqueous potassium acetate solution | 5.4 parts by weight |
| Polyisocyanate (crude MDI, Desmodur-44V20, a product of Bayer AG, Leverkusen) | 211 parts by weight |
| Isocyanate index | 197 |

The foam showed no shrinkage and was suitable for technical purposes.

The results of the foaming tests are shown in the following Table.

| | Example 1 | Example 2 |
|---|---|---|
| Reactivity | | |
| a) cream time, s | 19 | 19 |
| b) gel time, s | 46 | 47 |
| Free density, kg/m3 | 40.4 | 38.8 |
| Dimensional stability over 5 h at 130° C. | | |
| length, % | +1.15 | −0.11 |
| width, % | −1.26 | +0.78 |
| height, % | −2.02 | −0.14 |
| Evaluations* | | |
| curing | 3 | 1 |
| foam structure | 2 | 1 |
| base defects | Average | None |

*Evaluation marks:
1 = very good
2 = good
3 = satisfactory
4 = adequate
5 = poor Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of rigid foams containing urethane and isocyanurate groups comprising reacting
   a) a polyisocyanate with
   b) a compound having at least two isocyanate-reactive hydrogen atoms and a molecular weight of from about 400 to about 10,000 at an index greater than 150 in the presence of
   c) an aqueous solution of an alkali metal carboxylate in which the alkali metal carboxylate content is from about 10 to about 50% by weight.

2. The process of claim 1 in which the index is from about 170 to about 300.

3. The process of claim 1 in which the alkali metal carboxylate is potassium acetate.

4. The process of claim 1 in which the alkali metal carboxylate is from about 20 to about 40% by weight of c).

5. The process of claim 1 in which c) is used in an amount such that the reaction mixture contains at least 1% by weight water, based on the polyisocyanate.

6. The process of claim 1 in which c) is used in an amount such that the reaction mixture contains at least 1.4% by weight water, based on the polyisocyanate.

7. The process of claim 1 in which a chain extending and/or crosslinking agent having at least two isocyanate-reactive hydrogen atoms and a molecular weight of from about 32 to 399 is included in the reaction mixture.

8. The process of claim 1 in which a halogen-free flame retarding agent is included in the reaction mixture.

* * * * *